March 31, 1953     L. E. PULVER     2,632,973
FISHING LURE
Filed May 28, 1951
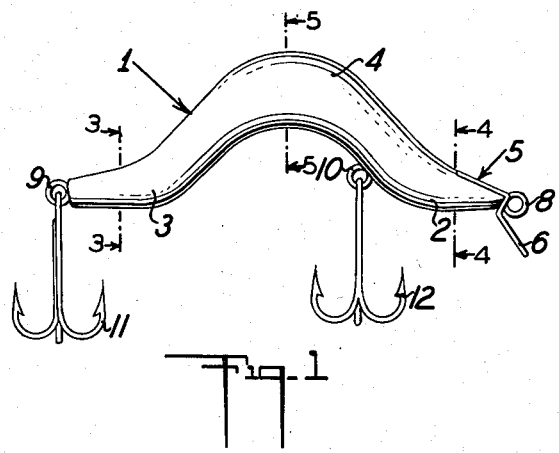
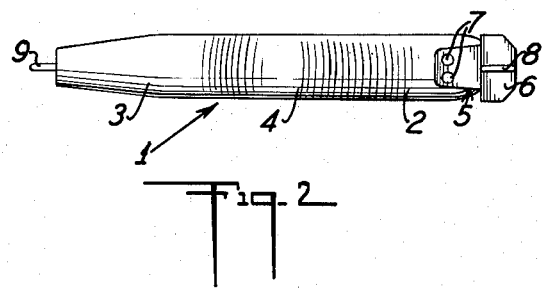
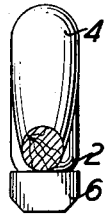 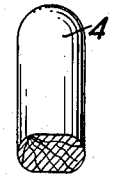 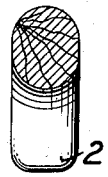
 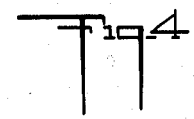
INVENTOR.
LYNN E. PULVER
BY
*Robert U. Geib, Jr.*
ATTORNEY Patented Mar. 31, 1953

2,632,973

UNITED STATES PATENT OFFICE 2,632,973

FISHING LURE

Lynn E. Pulver, Swea City, Iowa

Application May 28, 1951, Serial No. 228,678

3 Claims. (Cl. 43—42.47)

This invention relates to a fishing plug.

The principal object of my invention is to provide a fishing plug having new and novel features such that the plug is caused to assume a unique motion when moved relative to the water, thereby providing an extremely tempting fish lure.

Another object of my invention is the provision of a plug having a hump intermediate its length and a nose member having a portion projecting forwardly of the plug.

A further object is to provide a plug of the above-mentioned type which is inexpensive and easily manufactured.

Broadly, the invention comprises a plug which, extending from the front to the rear thereof, extends with respect to a vertical plane first concavely upward, then convexly, and then concavely downward. As a result of such a configuration, it can be seen that the plug body forms a hump intermediate its length, resulting in a shape often taken by a caterpillar during the course of its crawling movement. Attached at the front portion of the plug, I provide a nose member having a lip which projects forwardly of the plug. The combination of the plug body configuration with the forwardly projecting lip results in a side-to-side wobbling and a simultaneous rising or diving motion when my plug is in the water and subject to the forces thereof.

A preferred embodiment of my invention is described as hereinafter set forth in the specification and illustrated in the accompanying drawing wherein Figure 1 is a side elevation of the plug of my invention;

Figure 2 is a plan view;

Figure 3 is a section along the line 3—3 of Figure 1;

Figure 4 is a section along the line 4—4 of Figure 1; and

Figure 5 is a section along the line 5—5 of Figure 1.

Referring more particularly to the drawing, and to Figure 1, the numeral 1 designates generally the plug body which may be made of wood, plastic, etc. The front or line end of the plug is designated by the numeral 2, and the rear or tail of the plug is shown at 3. The plug 1 is provided with a hump section 4 intermediate its length.

Beginning from the forward part of the line end 2, the plug extends rearwardly first concavely upward and then forms a hump 4 by extending convexly. The rear portion 3 completes the hump by extending concavely downward. At the center of the hump 4, the plug has its area of largest cross-section, which is of generally oval shape and is best seen by reference to Figure 5. The cross-sectional area gradually decreases from the center of the hump both forwardly and rearwardly terminating in cross-sectional areas at the rear and front as shown in Figures 3 and 4, respectively. The forward decrease in cross-sectional area is due only to the decrease in the vertical dimension of the area, the horizontal dimension remaining substantially the same. The rearward decrease in area terminates in a substantially circular shape at the rear extremity. Both the line end 2 and the tail end 3 of the plug terminate in a generally horizontal direction.

Attached to the line end 2 of the plug is a nose member designated generally by the numeral 5 which, in the preferred embodiment of my invention, is Z-shaped. Nose member 5 is preferably formed from thin flat metal and has a width substantially equal to the width of my plug body. I have found that best results are obtained when the forwardly projecting lip referred to below has a width slightly larger than the plug body. The object of attaching a nose member to my plug is to provide a lip 6 projecting forwardly of the plug, as shown in Figure 1. When a Z-shaped nose member is employed, the cross-bar portion thereof is placed in juxtaposition to the flat nose of the line end 2 such that one leg projects forwardly of the plug and the other leg is flat against the top of the line end 2. The Z-shaped nose member is suitably attached to the plug by small screws, nails, etc., designated at 7. I have found that the characteristic movements of my plug are best attained when the forwardly projecting lip is preferably at an angle of between 15°–45° below the horizontal.

The cross-bar portion of the Z-shaped member is provided with a small opening sufficient to allow the passage of the shank of an eye screw 8, in order that the latter may be threadably secured in the plug body. Eye screw 8 provides the means for attaching to the plug a suitable line, not shown. In addition to eye screw 8, there are also provided eye screws 9 and 10 threadably secured to the plug body, as shown in Figure 1, and to which are attached hooks 11 and 12, respectively.

From the foregoing detailed description of a preferred embodiment of my invention, it can be seen that I have invented a new and novel fishing plug which is capable of a wide variety of irregular movements while in the water.

It should be understood that my invention is not intended to be limited by the embodiment illustrated herein, but only by the claims, as set forth hereinafter.

I claim:

1. A fishing plug of elongated length, the body of said plug forming an inverted U-like hump intermediate its length, the slopes of said hump extending from a portion near the top thereof concavely toward the ends of said plug, said plug having its cross-sectional area largest at the center of said hump, that portion of the plug extending rearwardly from said hump having a gradually decreasing cross-sectional area, that portion of the plug extending forwardly of the hump having only its vertical cross-sectional dimension gradually decreasing, the forward end of said plug terminating in a flat nose, and a Z-shaped member attached to the forward end of said plug, the cross-bar portion of said Z-shaped member being in juxtaposition to said flat nose of a portion of said plug, said Z-shaped member having a width substantially equal to the width of said plug.

2. A fishing plug of elongated length, the body of said plug forming an inverted U-like hump intermediate its length, the slopes of said hump extending from a portion near the top thereof concavely toward the ends of said plug, said plug having its cross-sectional area largest at the center of said hump, that portion of the plug extending rearwardly from said hump having a gradually decreasing cross-sectional area, that portion of the plug extending forwardly of the hump having only its vertical cross-sectional dimension gradually decreasing, the forward end of said plug terminating in a flat nose, a Z-shaped member attached to the forward end of said plug, the cross-bar portion of said Z-shaped member being in juxtaposition to said flat nose of a portion of said plug, said Z-shaped member having a width substantially equal to the width of said plug, and a leg of said Z-shaped member projecting forwardly of said plug positioned at an angle to the horizontal.

3. A fishing plug of elongated length, the body of said plug forming an inverted U-like hump intermediate its length, that portion of the body of the plug forming the slopes of said hump extending from a position near the top of said hump concavely toward the ends of said plug, said hump slopes terminating in the ends of said plug, and a nose member attached to the line end of said plug, said nose member having a lip portion extending forwardly of and below said line end at an angle to the horizontal.

LYNN E. PULVER.

REFERENCES CITED

The following references are of record in the file of this patent:

UNITED STATES PATENTS

| Number | Name | Date |
|---|---|---|
| D. 150,988 | Kinard | Sept. 14, 1948 |
| 1,101,223 | Welles | June 23, 1914 |
| 1,352,054 | Dills | Sept. 7, 1920 |
| 2,158,037 | Pflueger | May 9, 1939 |
| 2,314,907 | Sweeney | Mar. 30, 1943 |
| 2,506,263 | Bessinger | May 2, 1950 |
| 2,567,728 | Rivero | Sept. 11, 1951 |